UNITED STATES PATENT OFFICE.

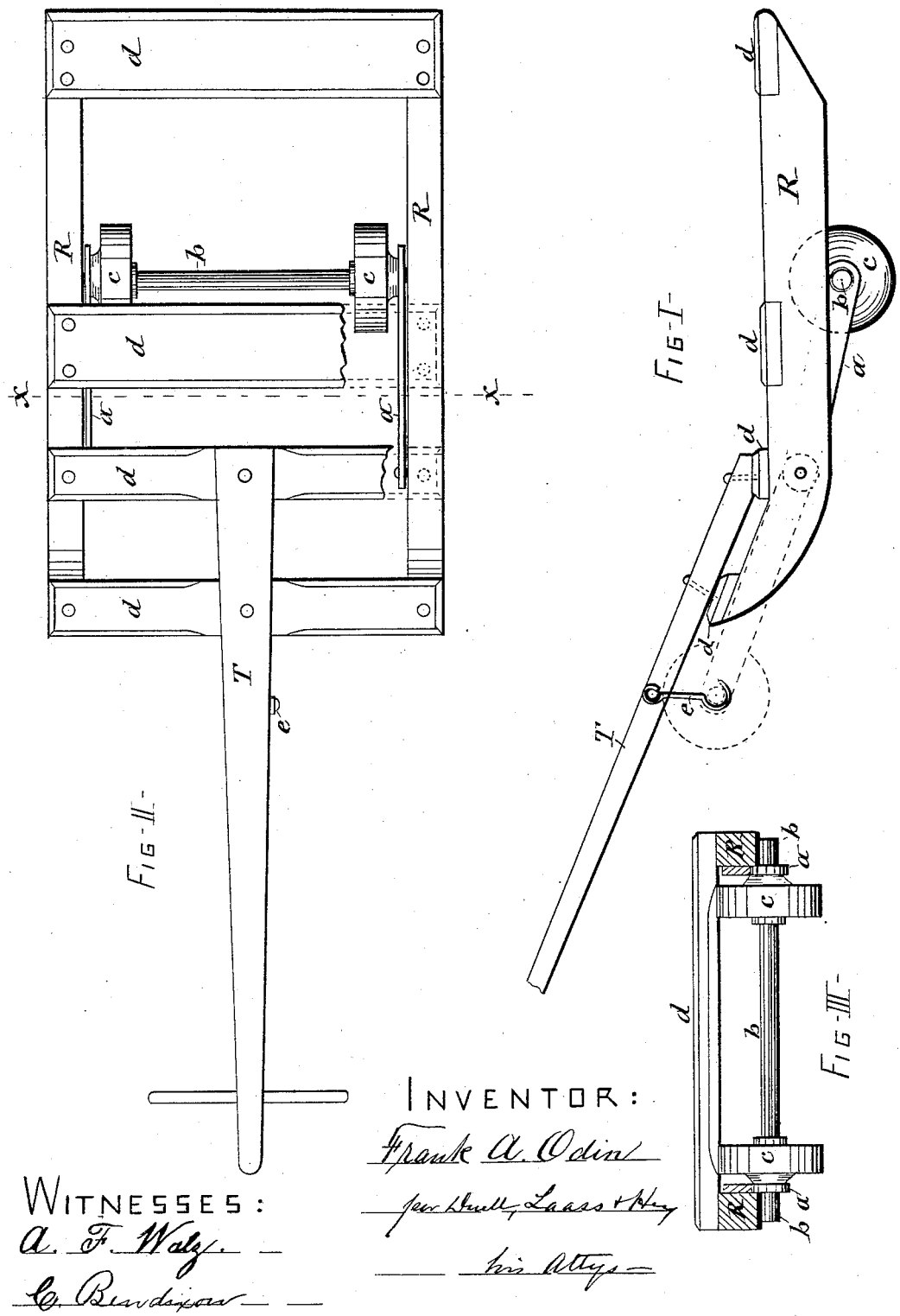

FRANK A. ODIN, OF SYRACUSE, NEW YORK.

HAND-TRUCK.

SPECIFICATION forming part of Letters Patent No. 340,955, dated April 27, 1886.

Application filed February 23, 1886. Serial No. 192,778. (No model.)

*To all whom it may concern:*

Be it known that I, FRANK A. ODIN, of Syracuse, in the county of Onondaga, in the State of New York, have invented new and useful Improvements in Hand-Trucks, of which the following, taken in connection with the accompanying drawings, is a full, clear, and exact description.

This invention consists in a novel construction of a hand-truck which has the side rails of its frame curved or beveled upward at the ends in the form of sleigh-runners, and has an axle arranged, adjustable in its position, so as to allow said axle either to support the truck-frame and carry the same on rollers, or to be removed from its said supporting position to carry the tread of the rollers above the tread of the runners, and thus allow the latter to be employed for drawing the truck over snow or ice when desired.

The invention is fully illustrated in the annexed drawings, wherein Figure I is a side elevation of my improved hand-truck. Fig. II is a plan view of the same; and Fig. III is a transverse section on line $x\, x$, Fig. I.

Similar letters of reference indicate corresponding parts.

R R are the two side rails of the truck-frame, said rails being firmly united by cross-bars $d\, d$, secured to the top thereof. The ends of these side rails I curve or bevel upward, similar to sleigh-runners, as shown in Fig. I of the drawings. On the side of each runner R, and at a point forward from the center thereof, I pivot an arm, $a$, which is of a length to reach part way toward the rear end of the runner, and when swung forward project beyond the front end of the runners, as represented by dotted lines in Fig. I of the drawings. I do not, however, limit myself to the pivoting of the arms $a\, a$ on the runners, inasmuch as they may be otherwise movably connected with the truck-frame to allow the rollers to be shifted without completely removing them from the truck. The two arms $a\, a$, I prefer to arrange on the inner sides of the runners, for the purpose of obviating projections on the exterior of the same.

$b$ denotes an axle, which is extended across the under side of the two runners R R, so as to enable it to support the truck-frame when placed in position for that purpose. This axle is connected to the free ends of the arms $a\, a$, and on the axle are journaled the rollers or wheels $c\, c$.

By swinging the free ends of the arms rearward the truck-frame is made to ride on the axle $b$, and is thus carried by the rollers $c\, c$, as represented in full lines in Fig. I of the drawings.

When it is desired to draw the truck over snow or ice, the arms $a\, a$ can be swung forward, and the axle $b$ raised and suspended from the tongue T by means of a hook or suitable catch, $e$, connected with the tongue, as illustrated by dotted lines in Fig. I of the drawings, and when the axle with its rollers are in this position the runners R R furnish the tread for the truck.

The tongue T is rigidly attached to the truck-frame, so as to allow the operator to balance the truck-frame when riding on the axle.

Having described my invention, what I claim as new, and desire to secure by Letters Patent, is—

1. In a hand-truck, the combination of the truck-frame formed with sleigh-runners and carrying rollers permanently connected with said frame and adapted to be shifted from their carrying position to an elevation above the tread of the aforesaid runners, as set forth.

2. A hand-truck composed of runners R R, framed together, arms $a\, a$, pivoted on the runners at points forward from the center thereof and reaching part way toward the rear of the same, an axle, $b$, extended across the under side of the runners and connected to the free ends of the arms $a\, a$, and rollers $c\, c$ on said axle, substantially as described and shown.

3. The combination of a truck-frame composed of runners R R, framed together by cross-bars $d\, d$, the tongue T, rigidly attached to said frame, the arms $a\, a$, pivoted on the sides of the runners at points forward from the center thereof and reaching part way toward the rear of the same, the axle $b$, extended across the under side of the runners and connected to the free ends of the aforesaid arms, rollers $c\ c$ on said axle, and the hook or catch $e$ on the tongue, adapted to support the axle in its elevated position in front of the runners, substantially as described and shown.

In testimony whereof I have hereunto signed my name and affixed my seal, in the presence of two attesting witnesses, at Syracuse, in the county of Onondaga, in the State of New York, this 19th day of February, 1886.

FRANK A. ODIN. [L. S.]

Witnesses:
FREDERICK H. GIBBS,
C. BENDIXON.